（12）United States Patent
Prokhorov

(10) Patent No.: US 9,709,414 B2
(45) Date of Patent: Jul. 18, 2017

(54) PERSONALIZED SUGGESTION OF AUTOMATED DRIVING FEATURES

(71) Applicant: Toyota Motor Engineering & Manufacturing North America, Inc., Erlanger, KY (US)

(72) Inventor: Danil V. Prokhorov, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/872,420

(22) Filed: Oct. 1, 2015

(65) Prior Publication Data
US 2017/0097241 A1 Apr. 6, 2017

(51) Int. Cl.
*G01C 22/00* (2006.01)
*G01C 21/36* (2006.01)
*G05D 1/00* (2006.01)

(52) U.S. Cl.
CPC .......... *G01C 21/36* (2013.01); *G05D 1/0088* (2013.01)

(58) Field of Classification Search
CPC .......... B60L 11/00; G01C 21/26; H04L 67/12

USPC ...................................... 701/22, 25, 36, 420
See application file for complete search history.

(56) References Cited

U.S. PATENT DOCUMENTS

| 2007/0001876 A1 | 1/2007 | Patenaude et al. |
| 2013/0024060 A1* | 1/2013 | Sukkarie ................ H04L 67/12 701/22 |
| 2013/0238439 A1 | 9/2013 | Chatterjee et al. |

* cited by examiner

*Primary Examiner* — Gertrude Arthur Jeanglaud
(74) *Attorney, Agent, or Firm* — Christopher G. Darrow; Darrow Mustafa PC

(57) ABSTRACT

A personalized suggestion for an automated driving feature of a vehicle can be made. Driving data for a travel route of a vehicle can be received. The driving data can include vehicle data and driving environment data. Based on the received driving data, it can be determined whether an automated driving feature could have been used for at least a portion of the travel route. Responsive to determining that the automated driving feature could have been used for the at least a portion of the travel route, a suggestion for using the automated driving feature can be generated. The suggestion can be presented to a user, such as the driver of the vehicle, or caused to be presented to the user. The automated driving feature may be currently included on the vehicle, or it may not be currently included on the vehicle.

20 Claims, 4 Drawing Sheets

PERSONALIZED SUGGESTION OF AUTOMATED DRIVING FEATURES

FIELD

Arrangements relate in general to vehicles and, more particularly, to automated driving features for vehicles.

BACKGROUND

In recent years, various automated driving features, such as adaptive cruise control and lane keeping, have become more commonly available on automobiles. Additional automated driving features are expected to become available in the near future. Despite their availability, many automated driving features are not offered as standard equipment on most vehicles. Vehicle dealers may promote automated driving features that are available as optional equipment on a vehicle. Consumers can learn about automated driving features through personal research, online or print reviews, and/or by word of mouth.

SUMMARY

In one respect, the subject matter described herein is directed to a method of making a personalized suggestion for an automated driving feature of a vehicle. The method can include receiving driving data for a travel route of a vehicle. The method can include determining whether an automated driving feature could have been used for at least a portion of the travel route based on the received driving data. The method can further include, responsive to determining that the automated driving feature could have been used for the at least a portion of the travel route, generating a suggestion for using the automated driving feature. The method can also include causing the suggestion to be presented.

In another respect, the subject matter described herein is directed to a system for making a personalized suggestion for using an automated driving feature of a vehicle. The system includes a processor. The processor can be programmed to initiate executable operations. The executable operations can include receiving driving data for a travel route of a vehicle. The executable operations can include determining whether an automated driving feature could have been used for at least a portion of the travel route based on the received vehicle driving data. The executable operations can further include, responsive to determining that the automated driving feature could have been used for the at least a portion of the travel route, generating a suggestion for using the automated driving feature. The executable operations can include causing the suggestion to be presented.

In another respect, the subject matter described herein is directed to a computer program product for making a personalized suggestion for using an automated driving feature of a vehicle. The computer program product includes a computer readable storage medium having program code embodied therein. The program code is executable by a processor to perform a method. The method includes receiving driving data for a travel route of a vehicle. The method includes determining whether an automated driving feature could have been used for at least a portion of the travel route based on the received driving data. The method includes, responsive to determining that the automated driving feature could have been used for the at least a portion of the travel route, generating a suggestion for using the automated driving feature. The method also includes causing the suggestion to be presented.

DETAILED DESCRIPTION

Figure 1:
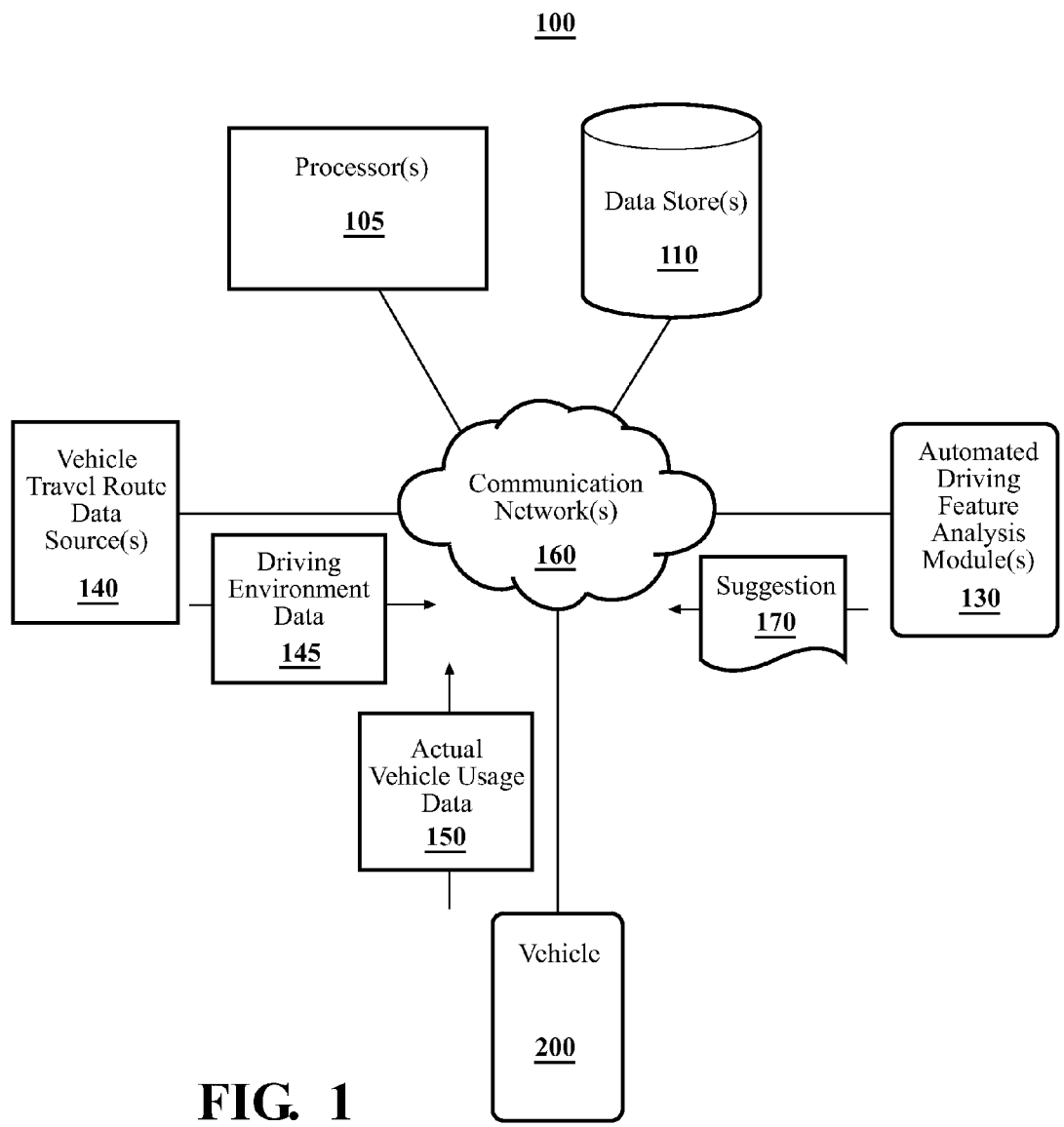
FIG. 1 is an example of a system for personalized suggestion of an automated driving feature for a vehicle.

This detailed description relates to personalized suggestions for an automated driving feature of a vehicle. Driving data for a travel route of a vehicle can be received. Based on the driving data, it can be determined whether an automated driving feature could have been used for at least a portion of the travel route. Responsive to determining that the automated driving feature could have been used for the at least a portion of the travel route, a suggestion for using the automated driving feature can be generated. The suggestion can be presented or caused to be presented to a user. Arrangements described herein can, for example, help to educate drivers as to the availability of and/or the benefits afford by such automated driving features.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

FIG. 1 is an example of a system 100 for personalized suggestion of an automated driving feature for a vehicle. Some of the possible elements of the system 100 are shown in FIG. 1 and will now be described. It will be understood that it is not necessary for the system 100 to have all of the elements shown in FIG. 1 or described herein. The system 100 can include a one or more processor(s) 105, one or more data store(s) 110, one or more automated driving feature analysis module(s) 130, one or more vehicle travel route data source(s) 140, and/or a vehicle 200.

The various elements of the system 100 can be communicatively linked through one or more communication networks 160. As used herein, the term "communicatively linked" can include direct or indirect connections through a communication channel or pathway or another component or system. A "communication network" means one or more components designed to transmit and/or receive information from one source to another.

The one or more communication networks 160 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network 160 further can be implemented as or include one or more wireless networks, whether short or long range. For example, in terms of short range wireless networks, the communication network 160 can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long range wireless networks, the communication network 160 can include a mobile, cellular, and or satellite-based wireless network and support voice, video, text, and/or any combination thereof. Examples of long range wireless networks can include GSM, TDMA, CDMA, WCDMA networks or the like. The communication network 160 can include wired communication links and/or wireless communication links. The communication network 160 can include any combination of the above networks and/or other types of networks. The communication network 160 can include one or more routers, switches, access points, wireless access points, and/or the like.

One or more elements of the system include and/or can execute suitable communication software, which enables two or more of the elements to communicate with each other through the communication network 160 and perform the functions disclosed herein. For instance, the vehicle 200 can be configured to send or otherwise provide actual vehicle usage data 150 to the automated driving feature analysis module 130 and/or one or more processors 105. For instance, the vehicle travel route data source(s) 140 can be configured to send or otherwise provide driving environment data 145 to the automated driving feature analysis module 130 and/or one or more processors 105. The automated driving feature analysis module 130 can be configured to determine and/or send suggestions 170 to a recipient (e.g., the vehicle 200, a portable communication device, etc.).

As noted above, the system 100 can include one or more processors 105. "Processor" means any component or group of components that are configured to execute any of the processes described herein or any form of instructions to carry out such processes or cause such processes to be performed. The processor(s) 105 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 205 can include at least one hardware circuit (e.g., an integrated circuit) configured to carry out instructions contained in program code. In arrangements in which there is a plurality of processors 105, such processors can work independently from each other or one or more processors can work in combination with each other. In one or more arrangements, one or more processors 105 can be located onboard the vehicle 200. In one or more arrangements, one or more processors 105 can be located remote from the vehicle 200. For instance, one or more processors 105 can be a remote server or a remote computing system. In one or more arrangements, one or more of the processors 105 can be located onboard the vehicle 200, and one or more of the processors 105 can be located remote from the vehicle 200.

The system 100 can include one or more data stores 110 for storing one or more types of data. The data store(s) 110 can include volatile and/or non-volatile memory. Examples of suitable data stores 110 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. In one or more arrangements, one or more data stores 110 can be located onboard the vehicle 200. In one or more arrangements, one or more data stores 110 can be located remote from the vehicle 200. For instance, one or more data stores 110 can be located on a remote processor or a remote computing system. In one or more arrangements, one or more data stores 110 can be located onboard the vehicle 200, and one or more data stores 110 can be located remote from the vehicle 200. The data store(s) 110 can be a component of the processor(s) 105, or the data store(s) 110 can be operatively connected to the processor(s) 105 for use thereby. The term "operatively connected," as used throughout this description, can include direct or indirect connections, including connections without direct physical contact.

The one or more automated driving feature analysis modules 130 and/or the one or more data stores 110 can be components of the one or more processors 105. In one or more arrangements, the one or more automated driving feature analysis modules 130 and/or the one or more data stores 110 can be stored on, accessed by and/or executed on the processor(s) 105. In one or more arrangements, the one or more automated driving feature analysis modules 130 and/or the one or more data stores 110 can be executed on and/or distributed among other processing systems to which the processor(s) 105 is communicatively linked. For instance, at least a portion of the one or more automated driving feature analysis modules 130 can be located onboard the vehicle 200. In one or more arrangements, a first portion of the one or more automated driving feature analysis modules 130 can be located onboard the vehicle 200 and a second portion of the one or more automated driving feature analysis modules 130 can be located remote from the vehicle 200 (e.g., on a cloud-based server, a remote computing system, one or more of the processors 105).

The automated driving feature analysis module(s) 130 can be implemented as computer readable program code that, when executed by a processor, implement one or more of the various processes described herein. The automated driving feature analysis module(s) 130 can be a component of one or more of the processor(s) 105, or the automated driving feature analysis module(s) 130 can be executed on and/or distributed among other processing systems to which one or more of the processor(s) 105 is operatively connected. In one or more arrangements, the automated driving feature analysis module(s) 130 can include artificial or computational intelligence elements, e.g., neural network, fuzzy logic or other machine learning algorithms.

The automated driving feature analysis module(s) 130 can include instructions (e.g., program logic) executable by a processor. Alternatively or in addition, one or more of the data stores 115 may contain such instructions. Such instructions can include instructions to execute various functions and/or to transmit data to, receive data from, interact with, and/or control: one or more elements of the system 100. Such instructions can enable the various elements of the system 100 to communicate through the communication network 160.

The automated driving feature analysis module(s) 130 can be configured to collect, obtain, acquire, and/or otherwise receive driving data from one or more sources. Driving data can be any data relating to the current travel of the vehicle. Driving data can include actual vehicle usage data 150 and/or driving environment data 145. Driving data can be used by the automated driving feature analysis module(s) 130 to determine whether an automated driving feature could have been used along at least a portion of the travel route.

"Actual vehicle usage data" is any data or information relating to the vehicle during operation. Non-limiting examples of actual vehicle usage data 150 can include information or data about the speed, acceleration, deceleration, braking, steering, pedal usage, gas consumption, position of the vehicle within a travel lane, a route traveled by the vehicle 200, telematics, GPS data, and/or location of the vehicle 200. Actual vehicle usage data 150 can be obtained, acquired, and/or received from the vehicle 200. As will be explained in more detail later in this description, the vehicle 200 can include one or more sensors to acquire such actual vehicle usage data 150. The actual vehicle usage data 150 can be obtained by the automated driving feature analysis module(s) 130 at any suitable time. For instance, the actual vehicle usage data can be obtained, acquired, and/or received in real-time or at a later time. As used herein, the term "real time" means a level of processing responsiveness that a user or system senses as sufficiently immediate for a particular process or determination to be made, or that enables the processor to keep up with some external process.

"Driving environment data" is any information or data about the environment in which the vehicle operates at any point along a travel path. It can also include information or data about an automated driving feature, which may or may not be installed on the vehicle 200. Various non-liming examples of driving environment data 145 will be described herein. Such data can include the presence of static and/or dynamics objects in the external environment of the vehicle 200, the proximity of the vehicle 200 to the objects, information about the objects, lane markers, traffic signaling devices (e.g., signs, lights, etc.), traffic rules (e.g., speed limits), and/or map data, just to name a few possibilities. In some instances, the driving environment data can include relevant data to support quantitatively the benefits of driving automated driving features for the specific trip taken by the person. The automated driving feature analysis module(s) 130 can collect, obtain, receive, and/or acquire the driving environment data 145 from one or more vehicle travel route data source(s) 140. "Vehicle travel route data source" means any source from which driving environment data can be collected, obtained, received, and/or acquired.

Various non-limiting examples of vehicle travel route data source(s) 140 will now be described. In one or more arrangements, the vehicle travel route data source(s) 140 can include the vehicle 200. For instance, data obtained from the vehicle's onboard sensors (e.g., radar sensors, lidar sensors, cameras, etc.) can provide driving environment data (e.g., the presence of objects, the location of the objects, the distance between the objects of the vehicle 200, etc.).

In one or more arrangements, the vehicle travel route data source(s) 140 can include sources external to the vehicle. For instance, one or more remote servers (e.g., one or more of the processor(s) 105) can include map data. The map data can include maps of one or more geographic areas. The map data can include information or data on roads, traffic control devices, road markings, structures, features, and/or landmarks in the one or more geographic areas. The map data can be in any suitable form. In some instances, the map data can include aerial views of an area. In some instances, the map data can include ground views of an area, including 360 degree ground views. The map data can be highly detailed. The map data can include terrain data. The terrain data can include information about the terrain of one or more geographic areas. The terrain data can include elevation data in the one or more geographic areas. The map data can include a digital map with information about road geometry. In some instances, the map data can be located onboard the vehicle 200.

In some instances, map formats can be constructed using location-based geographic features captured by the vehicle 200 for road-based objects such as traffic lights, traffic signs, lane lines, crosswalks, and curbs proximate to the vehicle 200 as it travels along a travel route. Information representing these geographic features can be captured using a sensor system in combination with an algorithm such as a random sample consensus (RANSAC) to differentiate lines, record the position of the vehicle 200, and collect data on position from a GNSS and/or an IMU. The captured information for these geographic features can then be manipulated using a simultaneous localization and mapping (SLAM) technique to position all of the geographic features in relation to the position of the vehicle 200. Alternatively, map formats can be constructed using overhead images (e.g. satellite images) of geographic features traced by a map editor that allows selection of different categories for each geographic feature, for example, traffic sign, road marking, etc. A background map format can be constructed using location information for geographic features that are able to be ignored during moving object detection and tracking processes performed by the vehicle 200 for decision making while traveling a planned vehicle path. This group of geographic features, that is, background objects, can include stationary road-based objects, or road features, such as traffic signs, guardrails, berms, etc., and mostly stationary natural objects such as trees, shrubs, or bushes that can produce foliage.

In one or more arrangements, the automated driving feature analysis module(s) 130 can be operatively connected to receive, obtain, collect and/or obtain information from one or more traffic rules libraries. The traffic rules library can include a set of traffic rules. The term "set of traffic rules" means one or more traffic rules. As used herein, "Traffic rule" is any law, rule, ordinance or authority that governs the operation of a motor vehicle, including motor vehicles in motion and motor vehicles that are parked or otherwise not in motion. The traffic rules can be international, federal, national, state, city, township and/or local laws, rules, ordinances and/or authorities. The traffic rules that are applicable to the travel path of the vehicle 200 can be obtained. The one or more traffic rules libraries can be located onboard the vehicle 200 or in a remote source (e.g., data store 110).

In one or more arrangements, the automated driving feature analysis module(s) 130 can be operatively connected to receive, obtain, collect and/or obtain information from relevant information about an automated vehicle feature. Such data can be obtained from any suitable source. For instance, such data can be obtained from a remote source (e.g., a cloud-based server, an automobile dealer data store, an original equipment manufacturer data store, etc.), which is communicatively linked to the automated driving feature analysis module(s) 130.

The automated driving feature analysis module(s) 130 can include instructions to determine whether an automated driving feature could have been used for at least a portion of the travel route based on the received driving data. Such a determination can include determining how much time and/or how often the vehicle could have been driven using the automated driving feature. Such a determination can be made based on empirical or estimated data or information relating to the automated driving feature. In one or more arrangements, such a determination can be made by analyzing information or data from another vehicle's traveling the same route with an automated driving feature activated. Such information can be obtained from any suitable source. For instance, such information can be located in the one or more data stores 110. Based on the received driving data, the automated driving feature analysis module(s) 130 can be configured to simulate the travel path of the vehicle 200 as if it had travelled at least a portion of the travel path with one or more automated driving features installed and activated.

Such instructions can include instructions to determine a personalized suggestion 170 for an automated driving feature. The suggestion can be determined in any suitable manner, and it can have any suitable form. Various examples of personalized suggestions 170 will be described herein.

Figure 2:
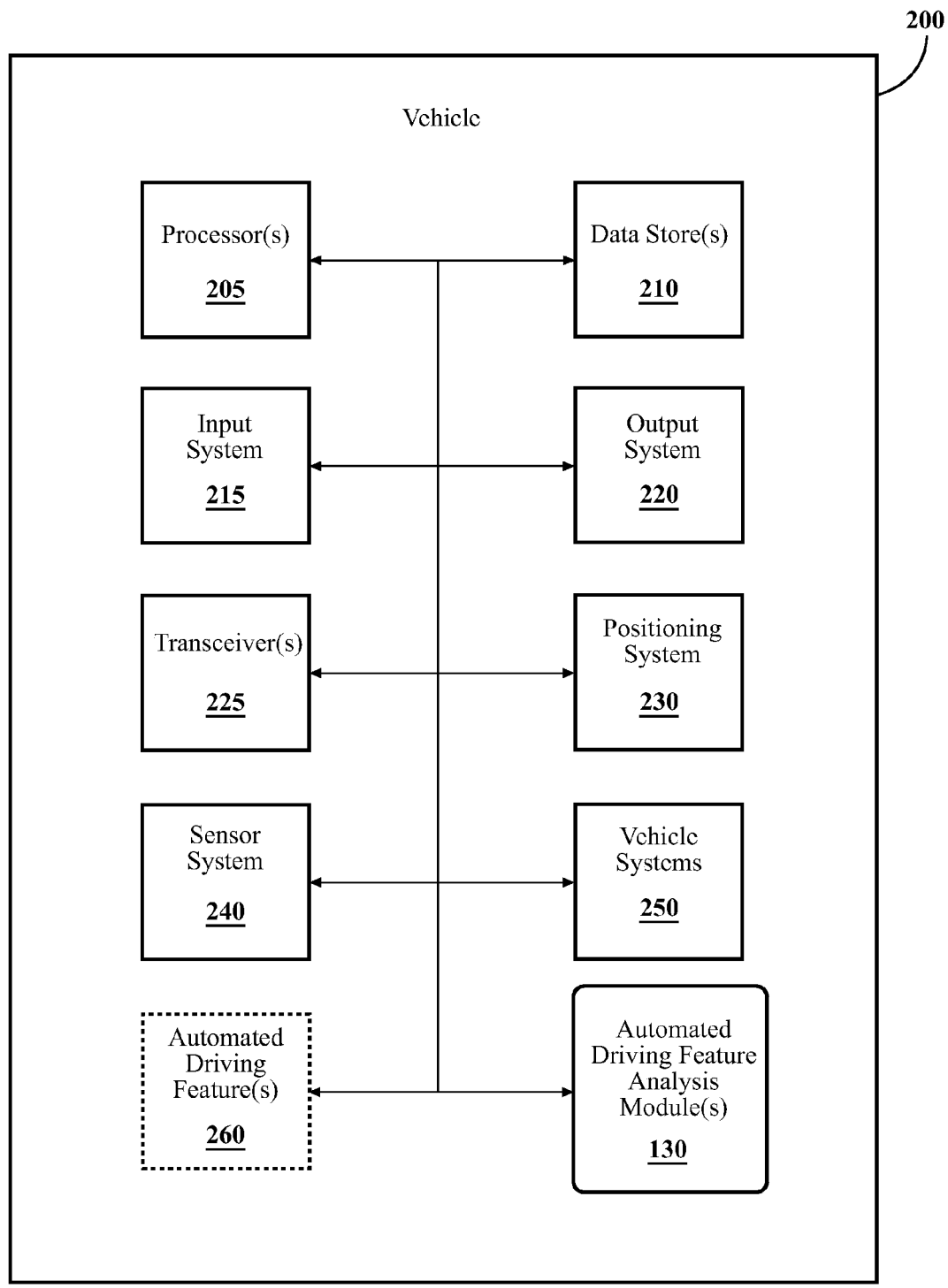
FIG. 2 is an example of a vehicle configured to provide a personalized suggestion of an automated driving feature for a vehicle.

The vehicle 200 will now be described in greater detail. Referring to FIG. 2, an example of the vehicle 200 is shown. The vehicle 200 can be any suitable type of vehicle. As used herein, "vehicle" means any form of motorized transport. In one or more implementations, the vehicle 200 can be an automobile. While arrangements will be described herein with respect to automobiles, it will be understood that embodiments are not limited to automobiles. In one or more implementations, the vehicle 200 may be a watercraft, an aircraft or any other form of motorized transport.

The vehicle 200 can include various elements. Some of the possible elements of the vehicle 200 are shown in FIG. 2 and will now be described. It will be understood that it is not necessary for the vehicle 200 to have all of the elements shown in FIG. 2 or described herein. The vehicle 200 can have any combination of the various elements shown in FIG. 2. Further, the vehicle 200 can have additional elements to those shown in FIG. 2. In some arrangements, vehicle 200 may not include one or more of the elements shown in FIG. 2. Further, while the various elements are shown as being located within the vehicle 200 in FIG. 2, it will be understood that one or more of these elements can be located external to the vehicle 200. Further, the elements shown may be physically separated by large distances.

The vehicle 200 can include one or more processors 205. The above description of the one or more processors 105 is equally applicable to the one or more processors 205. In some arrangements, the one or more processors 105 can be and/or can include the one or more processors 205. In one or more arrangements, one or more processors 205 can be a main processor of the vehicle 200. For instance, one or more processors 205 can be an engine control unit (ECU).

The vehicle 200 can include one or more data stores 210 for storing one or more types of data. The above description of the one or more data stores 110 is equally applicable to the one or more data stores 210. In some arrangements, the one or more data stores 110 can be and/or can include the one or more data stores 210. The data store(s) 210 can be a component of the processor(s) 205, or the data store(s) 210 can be operatively connected to the processor(s) 205 for use thereby.

The vehicle 200 can include an input system 215. An "input system" is defined as any device, component, system, element or arrangement or groups thereof that enable information/data to be entered into a machine. The input system 215 can receive an input from a vehicle occupant (e.g., a driver or a passenger). Any suitable input system 215 can be used, including, for example, a keypad, display, touch screen, multi-touch screen, button, joystick, mouse, trackball, microphone and/or combinations thereof.

The vehicle 200 can include an output system 220. An "output system" is defined as any device, component, system, element or arrangement or groups thereof that enable information/data to be presented to a vehicle occupant (e.g., a person, a vehicle occupant, etc.). The output system 220 can present information/data to a vehicle occupant. The output system 220 can include a display. "A "display" is defined as a component or a group of components that present information/data in visual form, including, for example, video, images, graphics, etc. Alternatively or in addition, the output system 220 may include a microphone, earphone and/or speaker. Some components of the vehicle 200 may serve as both a component of the input system 215 and a component of the output system 220.

The vehicle 200 can include one or more transceivers 225. As used herein, "transceiver" is defined as a component or a group of components that transmit signals, receive signals or transmit and receive signals, whether wirelessly or through a hard-wired connection. The one or more transceivers 225 can be operatively connected to the one or more processors 205 and/or the one or more data stores 210. The one or more transceivers 225 can enable communications between the vehicle 200 and other elements of the system 100. The one or more transceivers 225 can be any suitable transceivers used to access a network, access point, node or other device for the transmission and receipt of data.

The one or more transceivers 225 may be wireless transceivers using any one of a number of wireless technologies. Examples of suitable transceivers include a cellular transceiver, broadband Internet transceiver, local area network (LAN) transceiver, wide area network (WAN) transceiver, wireless local area network (WLAN) transceiver, personal area network (PAN) transceiver, body area network (BAN) transceiver, WiFi transceiver, WiMax transceiver, Bluetooth transceiver, 3G transceiver, 4G transceiver, ZigBee transceiver, WirelessHART transceiver, MiWi transceiver, IEEE 802.11 transceiver, IEEE 802.15.4 transceiver, or a Near Field Communication (NFC) transceiver, just to name a few possibilities. The one or more transceivers 225 can include any wireless technology developed in the future. Again, the one or more transceivers 225 can be any suitable combination of transceivers, including any combination of the transceivers noted above.

The vehicle 200 can include a positioning system 230. The positioning system 230 can include one or more mechanisms, devices, elements, components, systems, applications and/or combinations thereof, now known or later developed, configured to determine the geographic location of the vehicle 200 and/or to determine a travel route for the vehicle 200.

The positioning system 230 can include one or more mapping applications to determine a travel route for the vehicle 200. For instance, the mapping application can determine one or more suitable travel routes between an origin and a destination. A travel route may be selected based on one or more parameters (e.g., shortest travel distance, shortest amount of travel time, etc.). In some arrangements, the positioning system 230 can be configured to update the travel route dynamically while the vehicle 200 is in operation.

The positioning system 230 can include a global positioning system, a local positioning system or a geolocation system. The positioning system 230 can be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System. Further, the positioning system 230 can use Transmission Control Protocol (TCP) and/or a Geographic information system (GIS) and location services.

The positioning system 230 may include a transceiver configured to estimate a position of the vehicle 200 with respect to the Earth. For example, positioning system 230 can include a GPS transceiver to determine the vehicle's latitude, longitude and/or altitude. The positioning system 230 can use other systems (e.g., laser-based localization systems, inertial-aided GPS, and/or camera-based localization) to determine the location of the vehicle 200.

Alternatively or in addition, the positioning system 230 can be based on access point geolocation services, such as using the W3C Geolocation Application Programming Interface (API). With such a system, the location of the vehicle 200 can be determined through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs. Thus, it will be understood that the specific manner in which the geographic position of the vehicle 200 is determined will depend on the manner of operation of the particular location tracking system used.

The vehicle 200 can include a sensor system 240. The sensor system 240 can include one or more sensors. "Sensor" means any device, component and/or system that can detect, determine, assess, monitor, measure, quantify and/or sense something. The one or more sensors can be configured to detect, determine, assess, monitor, measure, quantify and/or sense in real-time.

In arrangements in which the sensor system 240 includes a plurality of sensors, the sensors can work independently from each other. Alternatively, two or more of the sensors can work in combination with each other. In such case, the two or more sensors can form a sensor network. The sensor system 240 and/or the one or more sensors can be operatively connected to the processor(s) 205, the data store(s) 210, and/or other element of the vehicle 200.

The sensor system 240 can include any suitable type of sensor. For example, the sensor system 240 can include one or more sensors configured to detect, determine, assess, monitor, measure, quantify and/or sense information about the vehicle 200. Alternatively or in addition, the sensor system 240 can include one or more sensors configured to detect, determine, assess, monitor, measure, quantify and/or sense information about the external environment in which the vehicle 200 is located, including information about objects in the external environment. Such objects may be stationary or moving objects. The other objects can be other vehicles, pedestrians, cyclists, and/or animals, just to name a few possibilities.

Alternatively or in addition to one or more of the above examples, the sensor system 240 can include one or more sensors configured to detect, determine, assess, monitor, measure, quantify and/or sense the location of the vehicle 200 and/or the location of objects in the environment, relative to the vehicle 200 and/or with respect to any suitable coordinate system. The sensor system 240 can include one or more sensors configured to detect, determine, assess, monitor, measure, quantify and/or sense position and orientation changes of the vehicle 200. The sensor system 240 can include sensors that can monitor one or more internal systems of the vehicle 200. Various examples of these and other types of sensors will be described herein. It will be understood that the embodiments are not limited to the particular sensors described.

As an example, in one or more arrangements, the sensor system 240 can include one or more radar sensors. "Radar sensor" means any device, component and/or system that can detect, determine, assess, monitor, measure, quantify and/or sense something using at least in part radio signals. In one or more arrangements, the sensor system 240 can include one or more lidar sensors. "Lidar sensor" means any device, component and/or system that can detect, determine, assess, monitor, measure, quantify and/or sense something using at least in part lasers. The lidar sensor can include a laser source and/or laser scanner configured to emit a laser signal and a detector configured to detect reflections of the laser signal.

In one or more arrangements, the sensor system 240 can include one or more cameras. "Camera" includes any device(s), component(s), and/or system(s) that is configured to capture visual data. "Visual data" includes video and/or image information/data. The one or more cameras can be high resolution cameras. The high resolution can refer to the pixel resolution, the spatial resolution, spectral resolution, temporal resolution and/or radiometric resolution. In one or more arrangements, the one or more cameras can be high dynamic range (HDR) cameras or infrared (IR) cameras. In one or more arrangements, one or more of the cameras can include a lens (not shown) and an image capture element (not shown). The image capture element can be any suitable type of image capturing device or system, including, for example, an area array sensor, a Charge Coupled Device (CCD) sensor, a Complementary Metal Oxide Semiconductor (CMOS) sensor, a linear array sensor, a CCD (color or monochrome). The image capture element may capture images in any suitable wavelength on the electromagnetic spectrum. The image capture element may capture color images and/or grayscale images.

The sensor system 240 can be configured to detect, determine, assess, monitor, measure, quantify and/or sense, directly or indirectly, the presence of one or more objects in the external environment of the vehicle 200, the position of each detected object relative to the vehicle 200, the distance between each detected object and the vehicle 200 in one or more directions, the elevation of each detected object, the speed of each detected object, the movement of each detected object, and/or other aspects. The sensor system 240 can be configured to capture location information for objects within the environment surrounding the vehicle 200 for use by the processor(s) 105 and/or 205, the automated driving feature analysis module 130, and/or other element(s) of the vehicle 200 and/or system 100. Data acquired by the sensor system 240, including actual vehicle usage data 150 and/or driving environment data 145, can be stored in any suitable manner. For instance, the driving data can be stored in one or more data stores 110 and/or 210.

The vehicle 200 can include one or more vehicle systems 250. For instance, the vehicle 200 can include a propulsion system, a braking system, a steering system, a throttle system, a transmission system, and/or a signaling system. The one or more vehicle systems 250 can include the positioning system 230. Each of these systems can include one or more mechanisms, devices, elements, components, systems, and/or combination thereof, now known or later develop. It will be understood that arrangements described herein are not limited to these specific vehicle systems. Indeed, the vehicle 200 can include more, fewer or different systems. It should be appreciated that although particular vehicle systems are separately defined, each or any of the systems or portions thereof may be otherwise combined or segregated via hardware and/or software within the vehicle 200.

The sensor system 240 can include one or more sensors for acquiring data relating to one or more of the vehicle systems 250. For instance, the sensor system 240 can include one or more sensors to acquire actual vehicle usage data 150 regarding the use of the braking system and/or the throttle system along at least a portion of a travel route. As another example, the sensor system 240 can include one or more sensors to acquire actual vehicle usage data 150 on the steering system and/or the signaling system of the vehicle 200 along at least a portion of a travel route.

In one or more arrangements, the vehicle 200 can include one or more automated driving features 260. An "automated driving feature" is any feature relating at least partially to the navigation and/or maneuvering of the vehicle and that can be performed automatically by the vehicle with little or no human input. Examples of the automated driving features 260 include adaptive cruise control, lane keeping, or autoparking. "Lane keeping" is any system(s), device(s), element(s), and/or component(s) configured to automatically keep a vehicle within a current travel lane. A "travel lane" is a portion of a road that is designated for use by a single line of vehicles and/or a portion of a road that is being used by a single line of vehicles. The lane keeping feature can be configured to detect, determine, assess, measure, analyze, recognize, and/or to identify travel lane markers and/or other road markers from visual data or other sensor data. The lane keeping feature can identify the travel lane marker using a machine vision system using any suitable technique, now known or later developed.

"Adaptive cruise control (ACC)" is any system(s), device(s), element(s), and/or component(s) configured to automatically adjust the speed of a vehicle to substantially maintain a safe distance and/or a predetermined distance from a forward vehicle. "Forward vehicle" is a vehicle that is located in the same travel lane as the present vehicle and is located ahead of the present vehicle in the travel direction of the current travel lane. No other vehicles are located in the travel lane between the present vehicle and the forward vehicle. Adaptive cruise control can adjust the speed of the vehicle based on data received from the sensor system 240. When the adaptive cruise control is active, the vehicle can otherwise be operated manually by a human driver. In some instances, adaptive cruise control is typically only available for limited speed ranges. "Autoparking" is any system(s), device(s), element(s), and/or component(s) configured to automatically park a vehicle in a designated parking space. Some aspects of the parking process may still be controlled by a human driver, such as managing the gas pedal. Again, it will be understood that these are merely examples and arrangements herein are not limited to this particular automated driving features. Indeed, arrangements described herein can be used in connection with any automated driving feature, now known or later developed. Examples of potential automated driving features that may be offered in the near future include full speed adaptive cruise control and traffic jam assist.

The one or more automated driving features 260 can be selectively activated and/or deactivated by a user. Thus, in some instances, a user may operate the vehicle 200 without activating any of the available automated driving features 260. It should be noted that, in some arrangements, the vehicle 200 may not currently have any automated driving features. In some instances, one or more automated driving features 260 may be available for addition, inclusion, installation, incorporation, and/or retrofit into the vehicle 200. In some instances, one or more automated driving features 260 may not be available for addition, inclusion, installation, incorporation, and/or retrofit into the vehicle 200.

In one or more arrangements, the vehicle 200 can include the one or more automated driving feature analysis modules 130 or at least a portion of the one or more automated driving feature analysis modules 130. The above description of the one or more automated driving feature analysis modules 130 presented in connection with FIG. 1 is equally applicable here. While FIG. 2 shows the vehicle 200 as having the automated driving feature analysis module 130, it will be understood that arrangements are not limited in this regard. Indeed, in some instances, the vehicle 200 may not include the automated driving feature analysis module(s) 130.

Figure 3:
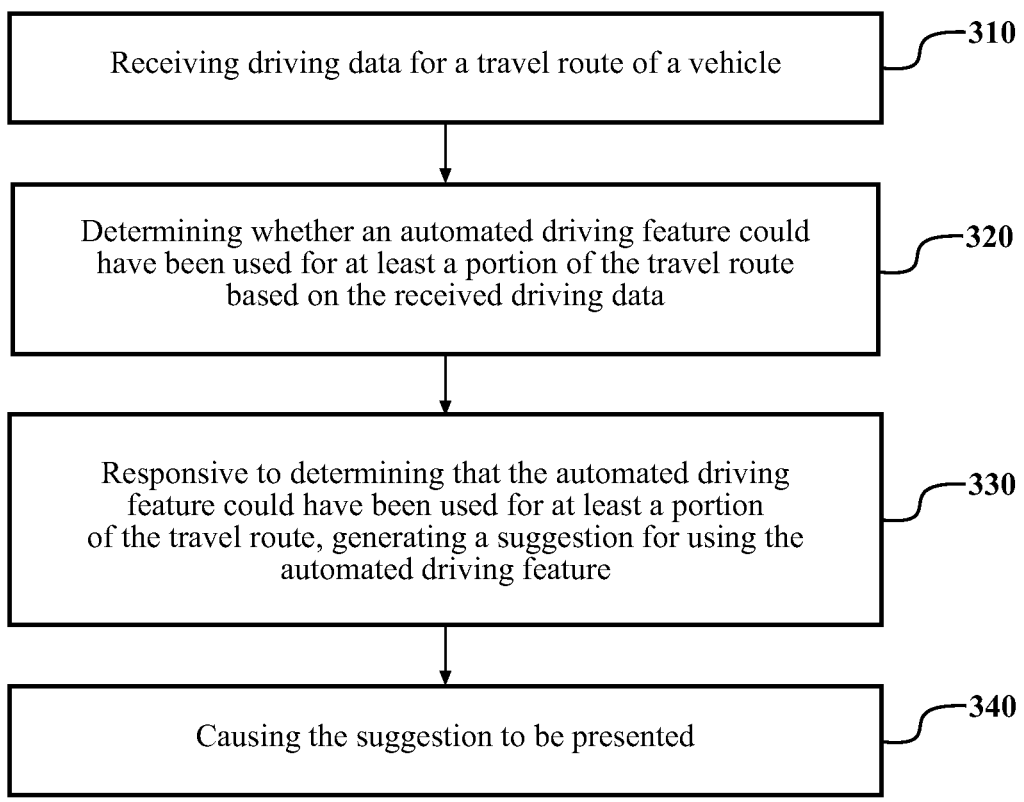
FIG. 3 is an example of a method of making a personalized suggestion of an automated driving feature for a vehicle.

Now that the various potential systems, devices, elements and/or components have been described, various methods of using such systems, devices, elements and/or components will now be described. Referring now to FIG. 3, an example of a method 300 a method of making a personalized suggestion for an automated driving feature of a vehicle is shown. Various possible steps of method 300 will now be described. The method 300 illustrated in FIG. 3 may be applicable to the embodiments described above in relation to FIGS. 1-2, but it is understood that the method 300 can be carried out with other suitable systems and arrangements. Moreover, the method 300 may include other steps that are not shown here, and in fact, the method 300 is not limited to including every step shown in FIG. 3. The steps that are illustrated here as part of the method 300 are not limited to this particular chronological order. Indeed, some of the steps may be performed in a different order than what is shown and/or at least some of the steps shown can occur simultaneously.

At block 310, driving data for a travel route of a vehicle can be received. "Driving data for a travel route" includes driving for an entire travel route from the origin to the destination or any one or more portions thereof. The driving data can be received by any suitable element of the system 100. For example, the driving data can be received by the one or more automated driving feature analysis modules 130 and/or the one or more processors 105, 205. The driving data can be received from any suitable source. For instance, the driving data can include actual vehicle usage data 150 from the vehicle 200. The driving data can include driving environment data 145 from any suitable vehicle travel route data source 140. The driving data can be received in any suitable manner. As an example, the driving data can be automatically sent by the vehicle 200 and/or one or more of the vehicle travel route data sources 140. Alternatively or in addition, the driving data can be sent by one or more of the vehicle travel route data sources 140 in response to a request or a query, such as a query or request from the automated driving feature analysis module 130. Alternatively or in addition, the driving data can be obtained, received, and/or collected by the automated driving feature analysis module 130 and/or the processor(s) 105, 205. The driving data can be received on any suitable basis, such as continuously, periodically at any suitable interval, irregularly, and/or randomly. The method 300 can continue to block 320.

At block 320, it can be determined whether an automated driving feature 260 could have been used for at least a portion of the travel route based on the received driving data. Such a determination can include determining how much time and/or how often the vehicle could have been driven using the automated driving feature. The determination can be made by any suitable element of the system 100 or portion thereof. For instance, the determination can be made by the automated driving feature analysis module 130. The method 300 can continue to block 330.

At block 330, responsive to determining that the automated driving feature 260 could have been used for the at least a portion of the travel route, a suggestion 170 for using the automated driving feature 260 can be generated. The suggestion 170 can have any suitable form. In one or more arrangements, the suggestion 170 can be that a particular automated driving feature 260 could have been used for at least a portion of the travel route. In some instances, the suggestion 170 can be accompanied by other information. For instance, the other information can include: whether the automated driving feature 260 is currently installed on the vehicle 200, whether the automated driving feature 260 is currently installed on the vehicle 200 but requires activation or set-up, whether the automated driving feature 260 is available for installation on the vehicle 200, information about the automated driving feature 260 (e.g., how it works, cost, etc.), savings and/or benefits that may be realized by using the automated driving feature 260, and/or reviews of the automated driving feature 260, just to name a few possibilities. The method 300 can continue to block 340.

At block 340, the suggestion 170 can be presented to a user or can be caused to be presented to a user. As used herein, "cause" or "causing" means to make, force, compel, direct, command, instruct, and/or enable an event or action to occur or at least be in a state where such event or action may occur, either in a direct or indirect manner. In one or more arrangements, the automated driving feature analysis module 130, the processor(s) 205, and/or the processor(s) 105 can present the suggestion 170 or can cause the suggestion 170 to be presented. The suggestion 170 can be presented in any suitable form, including visually and/or audibly.

In one or more arrangements, the suggestion 170 can be presented or caused to be presented on the output system 220 of the vehicle 200. As another example, the suggestion 170 to be presented on a computing device (e.g., a smart phone, a laptop computer, a tablet computer, a desk-top computer, etc.). In one or more arrangements, the suggestion 170 can be sent as a text message or as an email. In one or more arrangements, can be caused to be output on a display, a printer, and/or in a message (e.g., a text message, electronic mail message, etc.).

The method 300 can end. Alternatively, the method 300 can return to block 310 or some other block. The method 300 can repeat at any suitable point, such as at a suitable time or upon the occurrence of any suitable event or condition. As a further alternative, the method 300 can include additional and/or alternative blocks (not shown). For instance, if it is determined that the automated driving feature 260 could not have been used for the at least a portion of the travel route, then a suggestion is not generated. As another example, the method 300 can include generating driving data for a reference vehicle equipped with the automated driving feature traveling along the travel route. In such case, determining whether an automated driving feature could have been used for the at least a portion of the travel route includes comparing the received driving data to the generated driving data for the reference vehicle.

It should be noted that blocks of the method described above can be occur at any suitable time. For instance, one or more of the blocks 310, 320, 330, 340 can occur in real-time as the vehicle 200 travels along the travel route. As another example, one or more of the blocks 310, 320, 330, 340 can occur once the destination of current vehicular travel is reached or after a segment of the travel route is completed. As still another example, one or more of the blocks 310, 320, 330, 340 can occur at a later time (e.g., minutes, days, weeks, or months later).

A non-limiting example of making a personalized suggestion for an automated driving feature of a vehicle in accordance with systems and methods described herein will now be presented. A driver may own a vehicle 200 that is equipped with adaptive cruise control. The driver can operate the vehicle 200 along a travel route between an origin and a destination. During such operation, the adaptive cruise control is not used.

Driving data can be collected as the vehicle 200 is driven along the travel route. The driving data can include actual vehicle usage data 150 and/or driving environment data 145. The driving data can be obtained from the vehicle 200 and/or one or more vehicle travel route data sources 140. The driving data can be analyzed by the automated feature analysis module(s) 130 and/or the processor(s) 105, 205. The automated feature analysis module(s) 130 and/or the processor(s) 105, 205 can be located onboard the vehicle 200. Alternatively, the automated feature analysis module(s) 130 and/or the processor(s) 105, 205 can be located remote from the vehicle 200, such as in a remote server or computing system (e.g., a cloud-based server). The automated feature analysis module(s) 130 and/or the processor(s) 105, 205 can determine whether the adaptive cruise control could have been used for at least a portion of the travel route based on the received driving data.

A non-limiting example of the analysis performed by the automated feature analysis module(s) 130 and/or the processor(s) 105, 205 will now be described. Given the knowledge of the driving route, presence of stop signs or traffic lights/their timing, speed limits, and other route-specific information, the automated feature analysis module(s) 130 can calculate that the adaptive cruise control is available whenever the vehicle 200 is driving on the all of the road segments between the intersections, divide the distances of such segments by the respective speed limits to determine the times, and sum the times to obtain a maximum time of driving with the adaptive cruise control engaged. In some instances, the calculation of the maximum time of driving with the adaptive cruise control engaged can also include the crossing of at least some intersections with the adaptive cruise control engaged. The adaptive cruise control can be engaged when crossing intersections if there is a favorable timing of the traffic lights whenever the vehicle 200 approaches such intersections.

If it is determined that the adaptive cruise control could have been used for at least a portion of the travel route, then the automated driving feature analysis module(s) 130 and/or the processor(s) 105, 205 can determine a suggestion 170 for using the adaptive cruise control. The suggestion 170 can have any suitable content. As an example, the suggestion 170 can be a notification to the user that the vehicle 200 is equipped with adaptive cruise control. The suggestion 170 can present additional information, such as how much (e.g., on a distance, time, percentage, and/or other suitable basis) the adaptive cruise control could have been used along the travel route, the benefits of the adaptive cruise control, or other relevant information.

Figure 4:
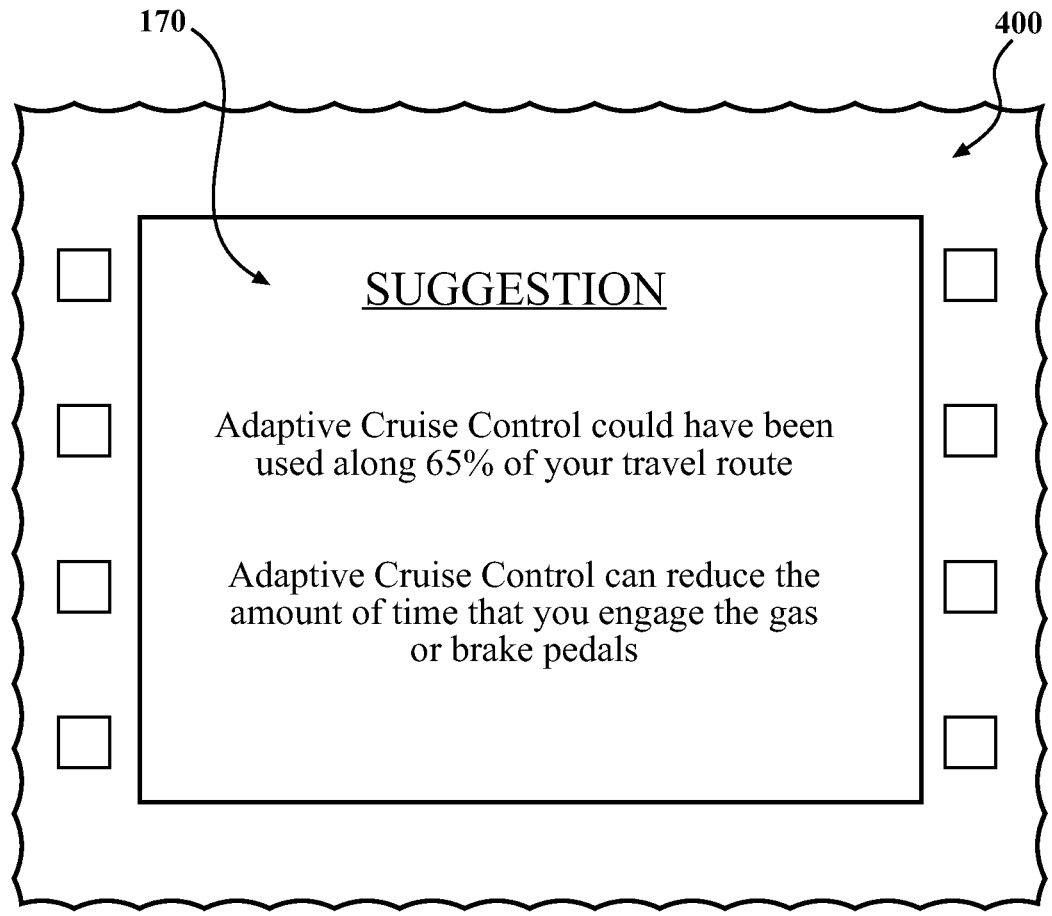
FIG. 4 is an example of a personalized suggestion of an automated driving feature being presented on a display.

The automated driving feature analysis module(s) 130 and/or the processor(s) 105, 205 can present the suggestion 170 to a user or can cause the suggestion 170 to be presented to the user. The suggestion 170 can be presented in any suitable manner. For instance, the suggestion 170 can be presented audibly and/or visually. FIG. 4 shows one example in which the suggestion 170 is presented visually on a display 400. The suggestion 170 can have any suitable form, content and features. Thus, it will be understood that the suggestion 170 shown in FIG. 4 is provided merely as an example and is not intended to be limiting.

The display 400 can be any suitable type of display. In one or more arrangements, the display 400 can be a part of the output system 220 and/or the input system 215 of the vehicle 200. In some arrangements, the display 400 can be a portion of another vehicle system, such as a navigation system, a vehicle radio or audio system, a backup camera display and/or other vehicle monitor. In one or more arrangements, the display 400 can be located in a front interior portion of the vehicle 200. For instance, the display 400 can be included in a dashboard or instrument panel (not shown) of a vehicle. In one or more arrangements, the display 400 can be the display of a computing device, include a portable computing device of the user or some other person or entity.

While FIG. 4 shows the suggestion 170 are being presented visually on a display, it will be understood that arrangements are not limited in this regard. Indeed, the suggestion 170 can be presented in other visual forms, such as on paper or other media. In one or more arrangements, the suggestion 170 can be presented in an electronic file. Alternatively or in addition, the suggestion 170 can be audibly presented to a user, such as over a speaker within the vehicle 200 or on a portable computing device.

The user can decide whether or not to follow the suggestion 170. Over time, the awareness of the availability of adaptive cruise control on the vehicle 200 and the associated benefits may lead to the person using or purchasing the adaptive cruise control feature. If the adaptive cruise control feature is not included on the vehicle 200 and is not available for retrofit on the vehicle 200, then the user may consider purchasing a new vehicle that includes adaptive cruise control or may seek such a feature when he or she wishes to purchase a new vehicle.

It will be appreciated that arrangements described herein can provide numerous benefits, including one or more of the benefits mentioned herein. For example, arrangements described herein can inform, advise, and/or educate consumers of one or more automated driving features that can be used by the consumer. Arrangements described herein can make consumers aware of such features in a user-friendly manner. Arrangements described herein can make consumers aware of one or more automated driving features in a personal way, as the suggestion and/or other information can be specific to the user with respect to how and/or where he or she drives. Arrangements herein can inform, advise, and/or educate consumers of one or more automated driving features even if the vehicle is not currently equipped with such features. Arrangements described herein can entice a driver to consider installing an automated driving feature in his or her vehicle and/or to consider purchasing another vehicle that has such automated driving feature(s).

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of suggesting an automated driving feature of a vehicle, the method comprising:
    receiving driving data for a travel route of a vehicle;
    determining whether an automated driving feature is usable for at least a portion of the travel route based on the received driving data;
    responsive to determining that the automated driving feature is usable for the at least a portion of the travel route, generating a suggestion for using the automated driving feature; and
    causing the suggestion to be presented.

2. The method of claim 1, wherein determining whether an automated driving feature is usable for the at least a portion of the travel route is performed in real-time.

3. The method of claim 2, wherein causing the suggestion to be presented to a user is performed one of: in real-time or after completion of the travel route.

4. The method of claim 1, wherein the automated driving feature is an automated driving feature that is not currently included on the vehicle.

5. The method of claim 1, wherein the automated driving feature is an automated driving feature that is currently included on the vehicle but was not used during the travel route.

6. The method of claim 1, wherein the driving data includes actual vehicle usage data and driving environment data.

7. The method of claim 1, wherein determining whether an automated driving feature is usable for at least a portion of the travel route based on the received driving data includes determining at least one of how much time and how often the automated driving feature is usable for at least a portion of the travel route.

8. The method of claim 7, wherein the suggestion includes at least one of how much time and how often the automated driving feature is usable during at least a portion the travel route.

9. The method of claim 1, further including:
    generating driving data for a reference vehicle equipped with the automated driving feature traveling along the travel route, and
    wherein determining whether an automated driving feature is usable for the at least a portion of the travel route includes comparing the received driving data to the generated driving data for the reference vehicle.

10. A system for making a suggestion for using an automated driving feature of a vehicle, the system comprising:
    a processor, the processor being programmed to initiate executable operations comprising:
        receiving driving data for a travel route of a vehicle,
        determining whether an automated driving feature is usable for at least a portion of the travel route based on the received driving data;
        responsive to determining that the automated driving feature is usable for the at least a portion of the travel route, generating a suggestion for using the automated driving feature; and
        causing the suggestion to be presented.

11. The system of claim 10, wherein the processor is located onboard the vehicle, and further including one or more sensors operatively connected to the processor.

12. The system of claim 10, wherein the processor is located remote from the vehicle.

13. The system of claim 10, wherein the driving data includes actual vehicle usage data and driving environment data.

14. The system of claim 10, further including a display, wherein the display is operatively connected to the processor, and wherein causing the suggestion to be presented to a user includes causing the suggestion to be presented on the display.

15. The system of claim 10, wherein the automated driving feature is an automated driving feature that is not currently included on the vehicle.

16. The system of claim 10, wherein the automated driving feature is an automated driving feature that is currently included on the vehicle but was not used during the travel route.

17. The system of claim 10, wherein determining whether an automated driving feature is usable for at least a portion of the travel route based on the received driving data includes determining at least one of how much time and how often the automated driving feature is usable for at least a portion of the travel route.

18. A computer program product for making a suggestion for using an automated driving feature of a vehicle, the computer program product comprising a computer readable storage medium having program code embodied therein, the program code executable by a processor to perform a method comprising:

receiving driving data for a travel route of a vehicle;
determining whether an automated driving feature is usable for at least a portion of the travel route based on the received driving data;
responsive to determining that the automated driving feature is usable for the at least a portion of the travel route, generating a suggestion for using the automated driving feature; and
causing the suggestion to be presented.

19. The computer program product of claim 18, wherein determining whether an automated driving feature is usable for at least a portion of the travel route based on the received driving data includes determining at least one of how much time and how often the automated driving feature is usable for at least a portion of the travel route.

20. The computer program product of claim 18, wherein the automated driving feature is one of:
an automated driving feature that is currently included on the vehicle but was not used during the travel route, or
an automated driving feature that is not currently included on the vehicle.

\* \* \* \* \*